(12) United States Patent
Puckett et al.

(10) Patent No.: US 10,254,481 B2
(45) Date of Patent: Apr. 9, 2019

(54) INTEGRATED WAVEGUIDE WITH REDUCED BRILLOUIN GAIN AND A CORRESPONDING REDUCTION IN THE MAGNITUDE OF AN INDUCED STOKES WAVE

(71) Applicant: Honeywell International Inc., Morris Plains, NJ (US)

(72) Inventors: Matthew Wade Puckett, Scottsdale, AZ (US); Mary K. Salit, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/636,480

(22) Filed: Jun. 28, 2017

(65) Prior Publication Data

US 2018/0081115 A1    Mar. 22, 2018

Related U.S. Application Data

(60) Provisional application No. 62/397,054, filed on Sep. 20, 2016, provisional application No. 62/397,040, filed on Sep. 20, 2016.

(51) Int. Cl.
*H01S 3/00* (2006.01)
*G02B 6/125* (2006.01)
*G02B 6/136* (2006.01)

(52) U.S. Cl.
CPC ............ *G02B 6/125* (2013.01); *G02B 6/136* (2013.01); *H01S 3/0078* (2013.01)

(58) Field of Classification Search
None
See application file for complete search history.

(56) References Cited

U.S. PATENT DOCUMENTS

| 3,856,378 A | 12/1974 | Brandt et al. |
| 4,181,904 A | 1/1980 | Weller et al. |

(Continued)

FOREIGN PATENT DOCUMENTS

| EP | 0642052 A1 | 3/1995 |
| EP | 0969297 A1 | 1/2000 |
| WO | 2004027476 | 4/2004 |

OTHER PUBLICATIONS

Bogaerts, Wim et al. "Silicon microring resonators"; Laser Photonics Rev. 6, No. 1, pp. 47-73 (2012); www.lpr-journal.org.

(Continued)

*Primary Examiner* — Jerry Rahll
(74) *Attorney, Agent, or Firm* — Fogg & Powers LLC (57) ABSTRACT

An embodiment of an integrated waveguide is configured for reducing the level of Brillouin scattering, and for reducing the levels of at least some of the unwanted effects of Brillouin scattering. Such an integrated waveguide has a Brillouin gain, includes a cladding, and includes a core disposed within the cladding and configured to cause the Brillouin gain to be less than the Brillouin gain would be if the core were straight. For example, the core can be configured as a non-straight (e.g., meandering) core to reduce the Brillouin gain in an integrated waveguide, and, therefore, to reduce a level of coherent Brillouin scattering of an electromagnetic wave propagating through the waveguide. Therefore, a core so configured can reduce the energy of a counter-propagating Stokes wave induced by the propagating electromagnetic wave as compared to an otherwise comparable waveguide having a straight core.

27 Claims, 7 Drawing Sheets

(56) References Cited

U.S. PATENT DOCUMENTS

| | | | |
|---|---|---|---|
| 5,131,060 | A | 7/1992 | Sakata |
| 5,138,687 | A | 8/1992 | Horie et al. |
| 5,170,457 | A | 12/1992 | Jen |
| 5,329,397 | A | 7/1994 | Chang |
| 5,400,788 | A | 3/1995 | Dias et al. |
| 5,511,142 | A | 4/1996 | Horie et al. |
| 5,781,669 | A | 7/1998 | Schmid et al. |
| 5,841,913 | A | 11/1998 | Marcuse et al. |
| 6,052,215 | A | 4/2000 | Montgomery et al. |
| 6,233,379 | B1 | 5/2001 | Kim et al. |
| 6,253,002 | B1 | 6/2001 | Kim et al. |
| 6,266,462 | B1 | 7/2001 | Kim et al. |
| 6,282,332 | B1 | 8/2001 | Bosso et al. |
| 6,510,261 | B2 | 1/2003 | Sorin et al. |
| 6,535,665 | B1 | 3/2003 | Kim et al. |
| 6,542,683 | B1 | 4/2003 | Evans et al. |
| 6,587,623 | B1 | 7/2003 | Papen et al. |
| 6,636,201 | B1 | 10/2003 | Gomes et al. |
| 6,718,110 | B2 | 4/2004 | Carmannini et al. |
| 6,925,216 | B2 | 8/2005 | Vernon et al. |
| 6,929,899 | B2 | 8/2005 | Pottebaum et al. |
| 7,016,586 | B2 | 3/2006 | Zoorob et al. |
| 7,062,109 | B2 | 6/2006 | Tsunoda et al. |
| 7,103,245 | B2 | 9/2006 | Lee et al. |
| 7,174,080 | B2 | 2/2007 | Walker |
| 7,376,317 | B2 | 5/2008 | Yamada |
| 8,078,021 | B2 | 12/2011 | Ushida |
| 8,442,368 | B1 | 5/2013 | Reano et al. |
| 8,560,048 | B2 | 10/2013 | Eberle et al. |
| 2003/0156813 | A1 | 8/2003 | Terakawa et al. |
| 2003/0161375 | A1 | 8/2003 | Filgas et al. |
| 2003/0176002 | A1 | 9/2003 | Zhang et al. |
| 2004/0037532 | A1 | 2/2004 | Park et al. |
| 2004/0105485 | A1 | 6/2004 | Bures et al. |
| 2005/0286826 | A1 | 12/2005 | Tsunoda et al. |
| 2006/0037532 | A1 | 2/2006 | Eidson |
| 2008/0013906 | A1 | 1/2008 | Matsuo et al. |
| 2009/0148112 | A1 | 6/2009 | Koyamada et al. |
| 2009/0263092 | A1 | 10/2009 | Flammer et al. |
| 2010/0092132 | A1 | 4/2010 | Ushida |
| 2010/0238538 | A1 | 9/2010 | Rice et al. |
| 2011/0081123 | A1 | 4/2011 | Pare et al. |
| 2012/0189258 | A1 | 7/2012 | Overton et al. |
| 2013/0170802 | A1 | 7/2013 | Pitwon |
| 2013/0188918 | A1 | 7/2013 | Painchaud et al. |
| 2014/0320863 | A1 | 10/2014 | Christensen et al. |
| 2018/0081112 | A1 | 3/2018 | Puckett et al. |
| 2018/0081113 | A1 | 3/2018 | Puckett et al. |
| 2018/0081205 | A1 | 3/2018 | Puckett |
| 2018/0081206 | A1 | 3/2018 | Puckett et al. |

OTHER PUBLICATIONS

Mirnaziry et al., "Stimulated Brillouin Scattering in Silicon/Chalcogenide Slot Waveguides", Optics Express, Feb. 25, 2016, pp. 4786-4800, vol. 24, No. 5, Publisher: Optical Society of America.
U.S. Patent and Trademark Office, "Office Action"; U.S. Appl. No. 15/591,747; dated May 18, 2018; pp. 1-18; Published in: US.
U.S. Patent and Trademark Office; "Office Action" U.S. Appl. No. 15/379,165; dated May 18, 2018; pp. 1-30; Published: US.
European Patent Office, "Extended European Search Report for EP Application No. 17180384.4", "Foreign counterpart to U.S. Appl. No. 15/636,474", dated Jan. 5, 2018, pp. 1-8, Published in: EP.
European Patent Office, "Extended European Search Report for EP Application No. 17178890.4", "Foreign counterpart to U.S. Appl. No. 15/591,747", dated Jan. 11, 2018, pp. 1-11, Published in: EP.
European Patent Office, "Extended European Search Report for EP Application No. 17178891.2", "Foreign counterpart to U.S. Appl. No. 15/591,836", dated Jan. 11, 2018, pp. 1-11, Published in: EP.
United States Patent and Trademark Office, "Restriction Requirement for U.S. Appl. No. 15/591,836", dated Jan. 30, 2018, pp. 1-7, Published in: US.
European Patent Office, "Extended European Search Report for EP Application No. 17178894.6", "Foreign counterpart to U.S. Appl. No. 15/379,165", dated Jan. 17, 2018, pp. 1-11, Published in: EP.
Eggleton et al, "Inducing and Harnessing Stimulated Brillouin Scattering in Photonic Integrated Circuits", "Advances in Optics and Photonics 5", Dec. 19, 2013, pp. 536-587, Publisher: Optical Society of America.
Poulton et al, "Acoustic Confinement and Stimulated Brillouin Scattering in Integrated Optical Waveguides", "Journal of the Optical Society of America B", Oct. 1, 2013, pp. 2657-2664, vol. 30, No. 10, Publisher: Optical Society of America.
Rakich et al, "Traveling-wave Photon-phonon Coupling as the Basis for New Signal Processing Technologies", "Micro-and Nanotechnology Sensors, Systems, and Applications VI", , pp. 908317-1-908317-12, vol. 9083, Publisher: SPIE.
Shin et al, "Tailorable Stimulated Brillouin Scattering in Nanoscale Silicon Waveguides", "Nature Communications", Jun. 6, 2013, pp. 1-10, Publisher: Macmillan Publishers Limited.
U.S. Patent and Trademark Office, "Office Action", "from U.S. Appl. No. 15/379,165", dated Jun. 16, 2017, pp. 1-14, Published in: US.
United States Patent and Trademark Office, "Restriction Requirement", "from U.S. Appl. No. 15/379,165", dated Mar. 24, 2017, pp. 1-6, Published in: US.
Sriratanavaree, "Characterisation of Acoustic Waves in Optical Waveguides", "A Thesis Submitted for the Degree of Philosophy", Jan. 2014, pp. 1-233, Publisher: City University London, Published in: GB.
Ashraf Mohamedelhassan, "Fabrication of Ridge Waveguides in Lithium Niobate", Printed by Universitetsservice US AB, 2012, pp. i-58, No. ISSN: 0280-316X, Publisher: Royal Institute of Technology KTH, Published in: Stockholm, Sweden.
Bauters et al., "Planar Waveguides With Less Than 0.1 dB/m Propagation Loss Fabricated With Wafer Bonding", https://doi.org/10.1364/OE.19.024090, 2011, pp. 1-12, Publisher: Optical Society of America.
Courjal et al, "High Aspect Ratio Lithium Niobate Ridge Waveguides Fabricated by Optical Grade Dicing", "Journal of Physics", "https: //hal.archives-ouvertes.fr/hal-00637796", Dated Nov. 3, 2011, pp. 1-13, Publisher: IOP Publishing.
Laude et al, "Generation of Photons from Electrostriction in Small-Core Optical Waveguides", "AIP Advances 3, Apr. 21, 2009", Dated 2013, pp. Cover, 042109-1-042109-12, Publisher:American Institute of Physics.
Laude et al, "Lagrangian Description of Brillouin Scattering and Electrostriction in a Nanoscale Optical Waveguides", "New Journal of Physics", Dated 2015, "http://iopscience.iop.org/1367-2630/17/12/125003", Downloaded Dec. 12, 2015, Publisher: IOP Publishing.
Normandin et al, "Scattering of Guided Optical Beams by Surface Acoustic WAves in Thin Films", "Journal of Optical Society of America", Dated Aug. 1979, pp. 1153-1165, vol. 69, No. 8, Publisher: Optical Society of America.
Pennec et al, "Modeling Light-Sound Interaction in Nanoscale Cavities and Waveguides", "Nanophotonics 2014; 3 (6)", pp. 413-440, Publisher: Science Wise Publishing & De Gruyter.
Robinson, "A Dissertation presented to the Faculty of the Graduate School of Cornell University, Nanoscale Light Confinement: Principles, Measurement, and Applications", Dated Jan. 2009, pp. 1-108, : Publisher: Jacob Thomas Robinson.
Rowell et al, "Brillouin Scattering in a Thin Film Waveguide", "Applied Physics Letters, 32(3)", "https://doi.org/10.1063/1.89965", Dated Feb. 1, 1978, pp. Cover,154-155, Publisher: American Institute of Physics.
Schmidt et al, "Thin Film Acoustic Surface Waveguides on Anisotropic Media", "IEEE Transactions on Sonics and Ultrasonics", Dated Mar. 1975, pp. 115-122, vol. SU-22, No. 2, Publisher: IEEE.
Seshadri, "Quasi-optics of the Coupling of Guided Modes in Two Paralles, Indentical Dielectric Waveguides", "Journal Optical Society of America,", Dated Jun. 1987, pp. 1030-1036, vol. 4, No. 6, Publisher: Optical Society of America.
U.S. Patent and Trademark Office, Advisory Action for U.S. Appl. No. 15/379,165, dated Apr. 6, 2018, pp. 1-14, Published in: US.

(56) References Cited

OTHER PUBLICATIONS

U.S. Patent and Trademark Office, Restriction Requirement for U.S. Appl. No. 15/636,474, dated Apr. 4, 2018, pp. 1-13, Published in: US.
Wolff et al, "Germanium as a Material for Stimulated Brillouin Scattering in the Mid-infrared", "Optics Express", Dated: Dec. 15, 2014, pp. 30735-30747, vol. 22, No. 25, Publisher: OSA.
Yasumoto et al, "Numerical Analysis of Two-Parallel Embedded Optical Waveguides", "Journal Optical Society of America", Dated Sep. 1987, pp. 1713-1719, vol. 4, No. 9, Publisher: Optical Society of America.
Yasuura et al, "Numerical Analysis of Thin-Film Waveguide by Mode-Matching Method", "Journal Optical Society of America", Dated Feb. 1980, pp. 183-191, vol. 70, No. 2Publisher: Optical Society of America.
European Patent Office, "Extended European Search Report for EP Application No. 17181056.7", "from Foreign Counterpart to U.S. Appl. No. 15/636,480", dated Jan. 2, 2018, pp. 1-7, Published in: EP.
U.S. Patent and Trademark Office, "Office Action", "from U.S. Appl. No. 15/591,747", dated Dec. 14, 2017, pp. 1-21, Published in: US.
U.S. Patent and Trademark Office, "Final Office Action", "from U.S. Appl. No. 15/379,165", dated Dec. 20, 2017, pp. 1-20, Published in: US.
Barrios, "Optical Slot-Waveguide Based Biochemical Sensors", "Sensors 2009", Jun. 16, 2009, pp. 4751-4765.
Bian et al., "Design of a polymer-filled silicon nitride strip/slot asymmetric hybrid waveguide for realizing both flat dispersion and athermal operation", "Applied Optics", Jun. 20, 2016, pp. 4827-4832, vol. 55, No. 18.
Ma et al., "Acousto-optical interaction of surface acoustic and optical waves in a two-dimensional phoxonic crystal heterostructure cavity", "Optics Express", Nov. 17, 2014, pp. 1-9, vol. 22, No. 23.
Mirnaziry et al., "Stimulated Brillouin scattering in silicon/chalcogenide slot waveguides", "Optics Express", Mar. 7, 2016, pp. 4786-4800, vol. 24, No. 5.
Puckett et al., "Observation of second-harmonic generation in silicon nitried waveguides through bulk nonlinearities", "Optics Express 24", 2016, pp. 16923-16933.
Puckett et al., "Silicon nanoridge array waveguides for nonlinear and sensing applications", "Optics Express", Nov. 2, 2015, pp. 28224-28233, vol. 23, No. 22.
Rahman et al., "Characterization of acousto-optical interaction in planar silica optical waveguide by the finite element method", "Journal of the Optical Society of America B", May 2016, pp. 810-818, vol. 33, No. 5.
Sarabalis et al., "Guided acoustic and optical waves in silicon-on-insulator for Brillouin scattering and optomechanics", "APL Photonics", Apr. 19, 2016.
Sriratanavaree et al., "Rigorous analysis of acoustic modes in low and high index contrast silica fibers", "Applied Optics", Mar. 20, 2015, pp. 2550-2557, vol. 54, No. 9.
Sriratanavaree et al., "Rigorous characterization of acoustic-optical interactions in silicon slot waveguides by full-vectorial finite element method", "Optics Express", Apr. 21, 2014, pp. 9528-9537, vol. 22, No. 8.
Van Laer et al., "Analysis of enhanced stimulated Brillouin scattering in silicon slot waveguides", "Optics Letters", Mar. 1, 2014, pp. 1242-1245, vol. 39, No. 5.
Van Laer et al., "Interaction between light and highly confined hypersound in a silicon photonic nanowire", "Nature Photonics", 2015, pp. 199-203, vol. 9, No. 3.
Wang et al., "Slow light through tightly coupled light waves and acoustic waves in nanoscale waveguides", "Proceedings of SPIE, Advances in Slow and Fast Light VI", Mar. 6, 2013, pp. 1-14, vol. 8636.
Zhang et al., "Analysis fo acousto-optic interaction based on forward stimulated Brillouin scattering in hybrid phononic-photonic waveguides", "Optics Express", Jun. 13, 2016, pp. 13051-13059, vol. 24, No. 12.
U.S. Patent and Trademark Office, "Non-Final Office Action from U.S. Appl. No. 15/591,836", dated May 31, 2018, pp. 1-38, Published in: U.S.
U.S. Patent and Trademark Office, Non-Final Office Action from U.S. Appl. No. 15/636,480 dated Jul. 12, 2018, pp. 1-45, Published in: US.
U.S. Patent and Trademark Office, Non-Final Office Action from U.S. Appl. No. 15/636,474 dated Aug. 31, 2018, pp. 1-44, Published in: U.S.

INTEGRATED WAVEGUIDE WITH REDUCED BRILLOUIN GAIN AND A CORRESPONDING REDUCTION IN THE MAGNITUDE OF AN INDUCED STOKES WAVE

PRIORITY CLAIM

This application claims priority to U.S. Patent Application Ser. No. 62/397,054 filed 20 Sep. 2016, and to U.S. Patent Application Ser. No. 62/397,040, filed 20 Sep. 2016, the contents of these applications being incorporated by reference herein.

STATEMENT REGARDING FEDERALLY SPONSORED RESEARCH OR DEVELOPMENT

This invention was made with Government support under N66001-16-C-4017 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific)

SUMMARY

As an electromagnetic wave propagates through a carrier material, it can cause the material to vibrate in one or more acoustic modes called phonons. In these modes, the vibrations deform the material in a periodic fashion, and, therefore, set up deformation (i.e., pressure) waves that propagate through the material. These pressure waves cause the carrier material to oscillate in one or more resonant modes (i.e., acoustic modes), and this oscillating can cause a respective periodic change in one or more properties (e.g., the spacing between molecules or between atoms) of the material. For example, this oscillating can generate periodically varying acoustic dipoles within the carrier material via the photo-elastic effect. And these periodic changes in one or more properties of the carrier material can induce a change in the momentum of a portion of the generated electromagnetic wave. That is, the oscillating material can effectively scatter a fraction of the propagating electromagnetic wave's energy, and thus can generate one or more scattered electromagnetic waves at one or more frequencies that are different from the frequency of the generated electromagnetic wave.

For example, as a light wave (i.e., an electromagnetic wave having a wavelength in or near the optical or visible portion of the electromagnetic spectrum) propagates through an optical waveguide such as an optical fiber or an integrated optical waveguide, the propagating light wave excites, in the waveguide, one or more acoustic modes that cause the waveguide to act as an oscillating grating that diffracts, and thus scatters, a portion of the propagating light wave.

Such scattering of a propagating light wave caused by one or more acoustic modes that the light wave excites in a waveguide material is called Brillouin scattering.

If the Brillouin scattering of a propagating light wave is additive (i.e., coherent) along a propagation dimension within the waveguide, then the resulting one or more light waves generated by the coherent Brillouin scattering in the propagation dimension are called Stokes waves.

A Stokes wave typically has a frequency that is less than, i.e., downshifted from, the frequency of the propagating light wave because the portion of the energy of the propagating light wave that excites the one or more acoustic modes is absorbed by the waveguide material. As is known, the properties (e.g., phase, frequency, and energy) of a Stokes wave depend on the properties (e.g., phase, frequency, and energy) of the one or more acoustic modes that the propagating light wave excites in the waveguide, on the physical properties (e.g., atomic structure, molecular structure, crystal-lattice structure, dimensions, material, density, permittivity, permeability) of the waveguide and on the materials from which the waveguide is formed, and on conditions (e.g., temperature, humidity, stress, strain) to which the waveguide is exposed.

In a straight waveguide, a Stokes wave typically propagates in a direction opposite (counter) to the direction of propagation of the light wave that induces the Stokes wave; that is, a Stokes wave typically propagates in a reverse or backwards direction, i.e., in a direction that is opposite to the direction in which the Stokes-wave inducting light wave propagates. So if the Stokes-wave-inducing light wave enters a straight waveguide at a first end and exits the straight waveguide at a second end, then a Stokes wave induced by the light wave typically counter propagates toward, and exits the waveguide from, the first end.

Furthermore, the level of Brillouin scattering that a waveguide imparts to a propagating light wave is typically quantified as the Brillouin gain. Typically, the Brillouin gain of a waveguide is characterized as a function of the frequency or wavelength of the acoustic-mode-exciting light wave, and is plotted as a gain versus the frequency or the wavelength of the exciting light wave, where the gain equals the magnitude of the normalized ratio of the energy of the Brillouin scattered waves to the energy of the exciting light wave per unit length of the waveguide.

Moreover, the frequency and wavelength at which the Brillouin gain has a maximum, or peak, value typically depends on the properties (e.g., phase, frequency, and energy) of the one or more acoustic modes that the generated wave excites in the waveguide, on the physical properties (e.g., atomic structure, molecular structure, crystal-lattice structure, dimensions, material, density, permittivity, permeability) of the waveguide and the materials from which the waveguide is formed, and on conditions (e.g., temperature, humidity, stress, strain) to which the waveguide is exposed.

In addition, the full-bandwidth at half-maximum (FWHM) Brillouin gain is defined as a region around the peak value of the Brillouin gain bounded by the frequencies/wavelengths at which the Brillouin gain, in units of power or energy, is ½ the peak Brillouin gain.

For some applications, it is desirable to reduce or eliminate Stokes waves, and other effects of Brillouin scattering, in an optical waveguide.

For an integrated optical waveguide, e.g., an optical waveguide formed in or on an integrated-circuit die, it is generally assumed that the optical path length of the waveguide is short enough to render negligible the energy of generated Stokes waves and other unwanted effects of Brillouin scattering. For example, for an optical waveguide designed to carry a light wave having a wavelength, the optical path length of the waveguide is considered short enough to inhibit Stokes waves if the optical path length l is approximately within the following range: $0 < l \leq 5\lambda$. As used herein, "inhibit" Stokes waves means to cause the total energy of all induced Stokes waves to be less than an energy threshold that is suitable for the particular application.

One reason that the optical path length of an integrated optical waveguide is typically short enough to inhibit Stokes waves, and to avoid other unwanted effects of Brillouin scattering, is that its optical-path-loss coefficient, which is typically significantly greater than 0.05 decibel per centimeter (dB/cm), is large enough to render such a waveguide too inefficient to be practical if the waveguide is too long, e.g., longer than 1 centimeter. That is, integrated optical waveguides that are long enough to exhibit Stokes waves and other unwanted effects of Brillouin scattering are typically not made or used because their optical-path loss is too large for such waveguides be useful in conventional applications.

But as techniques for forming integrated optical waveguides improve, reported optical-path-loss coefficients are dropping to values equal to, and less than, 0.05 dB/cm.

Therefore, it is envisioned that due to the dropping of their optical-path-loss coefficients, integrated optical waveguides eventually will be made long enough such that with present integrated-optical-waveguide configurations, Stokes waves and other unwanted effects of Brillouin scattering will be significant in applications that incorporate, or otherwise use, such waveguides.

Unfortunately, there are no reported techniques for inhibiting Brillouin scattering, and its unwanted effects such as the generation of Stokes waves, in integrated optical waveguides having optical-path-loss coefficients ≤0.05 dB/cm.

But described below are one or more exemplary techniques for reducing the level of Brillouin scattering, and for reducing the levels of at least some of its unwanted effects (such as the generation of Stokes waves), even in integrated optical waveguides having optical-path-loss coefficients ≤0.05 dB/cm.

An exemplary embodiment of an integrated waveguide is configured for reducing the level of Brillouin scattering, and for reducing the levels of at least some of the unwanted effects of Brillouin scattering. Such an integrated waveguide has a Brillouin gain, includes a cladding, and includes a core disposed within the cladding and configured to cause the Brillouin gain to be less than the Brillouin gain would be if the core were straight. The cladding has a first index of refraction, and the core has a second index of refraction that is greater than the first index of refraction.

For example, the core can be configured as a non-straight (e.g., meandering) core to reduce the Brillouin gain in an integrated waveguide, and, therefore, to reduce a level of coherent Brillouin scattering of an electromagnetic wave propagating through the waveguide. Therefore, a core so configured can reduce the energy of a counter-propagating Stokes wave induced by the propagating electromagnetic wave as compared to an otherwise comparable waveguide having a straight core.

As a further example, the meandering core can include at least one bend having a radius, or an approximate radius, that is less than a wavelength of a propagating electromagnetic wave, that is less than a wavelength of a counter-propagating Stokes wave, or that is less than the wavelengths of both the propagating electromagnetic wave and the counter-propagating Stokes wave.

Furthermore, an embodiment of a method for forming such an integrated waveguide includes forming, between first and second cladding layers, a core having at least one bend. The first, or bottom, cladding layer is formed, e.g., over a substrate, and has a first index of refraction and a surface. A core layer has a second index of refraction, and is formed over the surface of the bottom cladding layer; and the core is formed, e.g., by patterning and etching the core layer. And the second, or top, optical cladding layer, which has approximately the first index of refraction, is formed over the core and the bottom optical cladding layer.

DETAILED DESCRIPTION

Each value, quantity, or attribute herein preceded by "substantially," "approximately," "about," a form or derivative thereof, or a similar term, encompasses a range that includes the value, quantity, or attribute ±20% of the value, quantity, or attribute, or a range that includes ±20% of a maximum difference from the value, quantity, or attribute. For example, "two planes are substantially parallel to one another" encompasses an angle −18°≤α≤+18° between the two planes (|90°| is the maximum angular difference between the two planes, ±20% of |90°| is ±18°, and the two planes are parallel to one another when α=0°). Similarly, "a substantially planar surface" encompasses an angle −18°≤ϕ≤+18° formed by a plane that bisects the surface and any arbitrary tangent to any point of the surface. Furthermore, a curve having an "approximate bend radius" encompasses a curve having an arc with at least one section, ±0.5° in length, where the difference between a distance to the center point of the arc and a distance to any other point of the section (the two distances each measured from the same point not intersecting the arc) is not more than ±20% of the distance to the center point of the arc.

FIGS. 1-5 are diagrams of respective integrated structures at various stages of a process for forming an integrated waveguide having a reduced Brillouin gain, according to an embodiment.

Figures 1, 2:
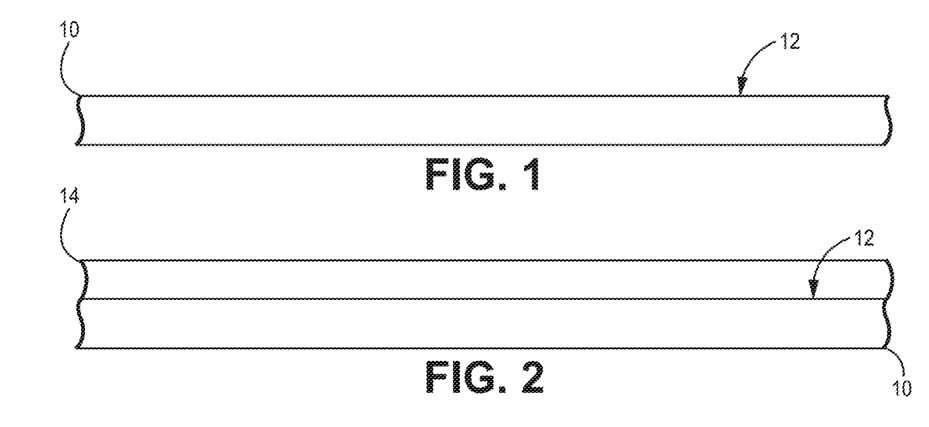
FIG. 1 is a side view of a bottom cladding layer formed during a process for forming an integrated optical waveguide having a reduced Brillouin gain, according to an embodiment.
FIG. 2 is a side view of a core layer formed over the bottom cladding layer of FIG. 1 during a process for forming an integrated optical waveguide having a reduced Brillouin gain, according to an embodiment.

FIG. 1 is a side view of a first, or bottom, cladding layer 10 formed during a process for forming an integrated optical waveguide having a reduced Brillouin gain, according to an embodiment. The bottom cladding layer 10, which has a surface 12, is formed conventionally over a flat surface of a conventional substrate (e.g., a silicon or sapphire substrate, not shown in FIG. 1) to a suitable thickness, to a suitable degree of optical transparency, and to a suitable first index of refraction $n_1$. For example, the bottom cladding layer 10 can be formed by any suitable process such as plasma-enhanced chemical vapor deposition (PECVD), sputtering, or chemical-vapor-deposition (CVD), can be formed from any suitable material such as Silicon Dioxide ($SiO_2$), Silicon Oxynitride (SiON), Zinc Oxide (ZnO), Aluminum Oxide ($Al_2O_3$), and Calcium Fluoride ($CaF_2$), can have a thickness in the approximate range of 3 microns (µm) to 15 µm, and can have the index of refraction $n_1$ in the approximate range of 1.08 to 2.5.

FIG. 2 is a side view of a core layer 14 formed over the surface 12 of the bottom cladding layer 10 of FIG. 1 during a process for forming an integrated optical waveguide having a reduced Brillouin gain, according to an embodiment. The core layer 14 is formed conventionally over the surface 12 of the bottom cladding layer 10 to a suitable thickness (e.g., approximately 1/10 the thickness of the bottom cladding layer), to a suitable degree of optical transparency, and to a suitable second index of refraction $n_2$ that is higher than the index of refraction $n_1$ of the bottom cladding layer 10. For example, the core layer 14 can be formed by any suitable process such as PECVD, sputtering, or CVD, can be formed from any suitable material such as Silicon (Si), Silicon Nitride ($SiN_x$), Silicon Oxynitride (SiON), Silicon Carbide (SiC), Diamond (C), Silicon Germanium (SiGe), Germanium (Ge), Gallium Arsenide (GaAs), Gallium Nitride (GaN), Gallium Phosphide (GaP), and Lithium Niobate ($LiNbO_3$), can have a thickness in the approximate range of 40 nanometers (nm) to 1.5 µm, and can have the index of refraction $n_2$ in the approximate range of 1.44 to 3.6 (the index of refraction $n_2$ is required to be greater than the index of refraction $n_1$).

Figure 3:
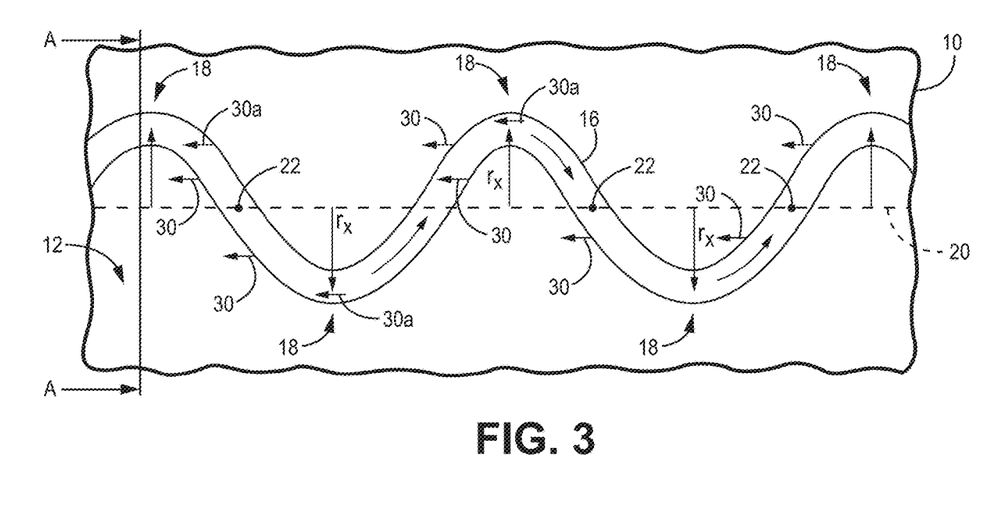
FIG. 3 is a plan view of the bottom cladding layer of FIGS. 1-2 and a core formed form the core layer of FIG. 2 during a process for forming an integrated optical waveguide having a reduced Brillouin gain, according to an embodiment.

FIG. 3 is a plan view of the bottom cladding layer 10 of FIGS. 1-2 and a waveguide core 16 formed from the core layer 14 of FIG. 2 during a process for forming an integrated optical waveguide having a reduced Brillouin gain, according to an embodiment. The core layer 14 is patterned and etched conventionally to form the core 16 as "meandering," "wavy," "wandering," or "curvy." For example, the core layer 14 can be patterned using conventional photolithography or electron-beam lithography, and can be etched anisotropically using, e.g., reactive ion etching (RIE) or wet etching. As described below, it is this non-straight, i.e., bent, shape of the core 16 that reduces the Brillouin gain of the waveguide. Although the core 16 is shown as having a sinusoidal shape in a plane that is approximately parallel to the surface 12 of the bottom cladding layer 10, each of the sinusoid peaks, i.e., bend regions, 18 can be approximated as a portion of a circle having a same approximate bend radius $r_x$ measured from an axis 20 that bisects the effective zero crossings 22 of the sinusoid that the core forms. But as described below in conjunction with FIGS. 9-10, the core 16 can have a shape other than sinusoid, can have bend regions 18 with different approximate radii, can have any suitable number of bend regions, and can even have circular bend regions.

Figure 4:
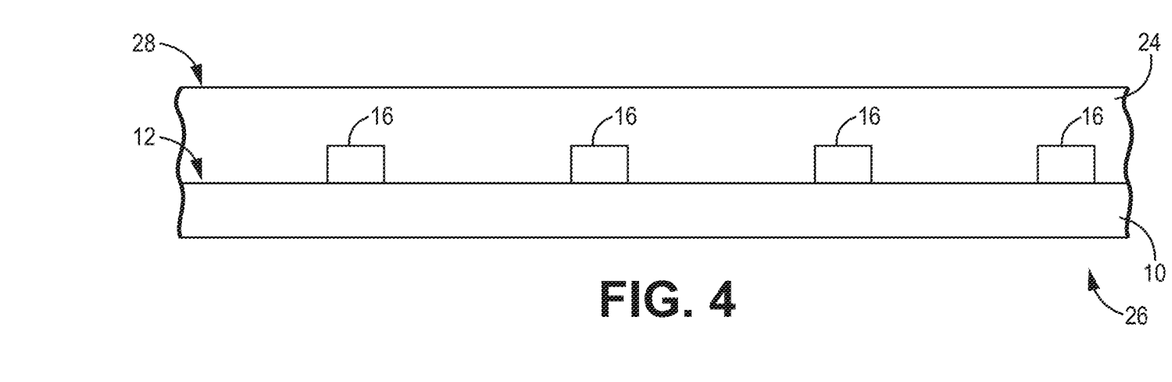
FIG. 4 is a side view, taken along the axis of FIG. 3, of the bottom cladding layer of FIGS. 1-3, the core of FIG. 3, and a top cladding layer formed over the core and the bottom cladding layer during a process for forming an integrated optical waveguide having a reduced Brillouin gain, according to an embodiment.

FIG. 4 is a cutaway side view, taken along the axis 20 of FIG. 3, of the bottom cladding layer 10 of FIGS. 1-3, the core 16 of FIG. 3, and a second, top cladding layer 24 formed over the core and the surface 12 of the bottom cladding layer to complete a process for forming an integrated optical waveguide 26 (only a portion of the waveguide shown in FIG. 4) having a reduced Brillouin gain, according to an embodiment. The top cladding layer 24 is formed conventionally over the core 16 and the surface 12 of the bottom cladding layer 10 to a suitable thickness, to a suitable degree of optical transparency, and to a suitable third index of refraction $n_3$. After formation of the top cladding layer 24, a surface 28 of the top cladding layer can be planed according to any suitable technique such as chemical-mechanical polishing (CMP). The top cladding layer 24 can be formed in a manner that is similar to, or different from, the manner in which the bottom cladding layer 10 is formed, and can be formed from a material that is the same as, or different from, the material from which the bottom cladding layer is formed. For example, the top cladding layer 24 can be formed by any suitable process such as PECVD, sputtering, or CVD, can be formed from any suitable material such as $SiO_2$, SiON, ZnO, $Al_2O_3$, and $CaF_2$, can have a thickness in the approximate range of 3 µm to 15 µm, and can have the index of refraction $n_3$ in the approximate range of 1.08 to 2.5. In an embodiment, the thickness of the top cladding layer 24 can be approximately the same as the thickness of the bottom cladding layer 10, and $n_3 \approx n_1$. Furthermore, although, in FIG. 4, the top cladding layer 24 is delineated from the bottom cladding layer 10, the top and bottom cladding layers may merge into a single cladding layer during the formation of the integrated optical waveguide 26 such that the top and bottom cladding layers are no longer distinguishable from one another. Such merging may be performed by a reflow process, particularly where the top cladding layer 24 and the bottom cladding layer 10 are formed from a same material such as $SiO_2$.

Figure 5:
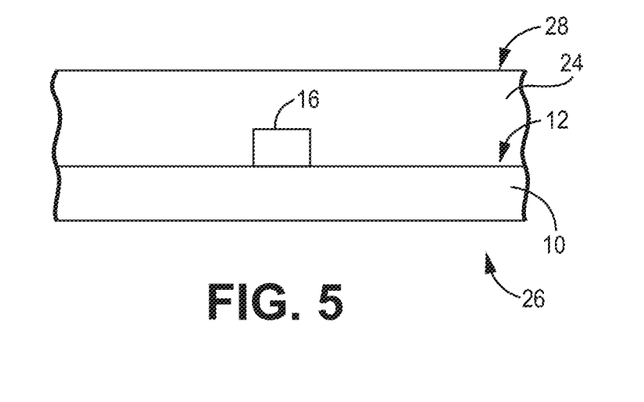
FIG. 5 is an end view, taken along lines A-A of FIG. 3, of the bottom cladding layer of FIGS. 1-3, the core of FIG. 3, and the top cladding layer of FIG. 4 formed over the core and the bottom cladding layer during a process for forming an integrated optical waveguide having a reduced Brillouin gain, according to an embodiment.

FIG. 5 is a cutaway side view of the integrated optical waveguide 26 taken along lines A-A of FIG. 3, according to an embodiment.

Referring to FIGS. 1-5, alternate embodiments of the method for forming the integrated optical waveguide 26 are contemplated. For example, the bottom cladding layer 10 and the top cladding layer 24 can be patterned and etched to follow the shape of the waveguide core 16. Or, multiple cores 16 can be formed between the top and bottom cladding layers 24 and 10 to form multiple integrated waveguides 26, and one or more of these multiple cores may have a meandering shape that is different from the meandering shape of one or more of the other ones of the multiple cores.

Still referring to FIGS. 1-5, the ability of the waveguide 26 to reduce Brillouin gain, and to inhibit the generation of Stokes waves, as compared to a waveguide having a straight core, is described according to an embodiment.

While experiencing an acoustic mode excited by an electromagnetic wave propagating through the core 16 in a direction from left to right in FIG. 3, the material from which the core is formed tends to vibrate back and forth along a dimension that is dictated by one or more properties (e.g., crystal-lattice structure) of the material.

For purposes of example, assume that for a particular acoustic mode, the core material vibrates back and forth in a dimension along, and parallel to, the axis 20. Arrows 30 in FIG. 3 show the directions in which the pressure waves generated by this vibration propagate into, through, and out from the core 16.

If the core 16 were straight instead of meandering, then the pressure waves would be coherent, i.e., would add constructively, along the optical path defined by the straight core, as would the Stokes waves that the pressure waves would induce (the Stokes waves would propagate in a direction opposite to the direction in which the inducing electromagnetic wave would propagate).

But because the core 16 is meandering, the pressure waves, and, therefore, the induced Stokes waves, are not coherent, and, therefore, do not add constructively, along an optical path defined by the core.

Although components of some Stokes waves (e.g., the Stoke waves counter propagating according to the arrows 30a) may be aligned with a propagation path of the core 16, and, therefore, may add constructively, the total energy of all the coherent Stokes waves counter propagating through the core is still significantly less than it would be if the core were straight instead of meandering. Therefore, it follows that even though the same level of Brillouin scattering may be occurring in the waveguide 26 as would be occurring in a waveguide with a straight core, the effective Brillouin gain that gives rise to Stokes waves within the meandering core 16 is significantly less than the Brillouin gain of a comparable waveguide with a straight core. That is, the waveguide 26 with the meandering core 16 has reduced Brillouin gain as compared to an otherwise comparable waveguide having a straight core.

Figure 6:
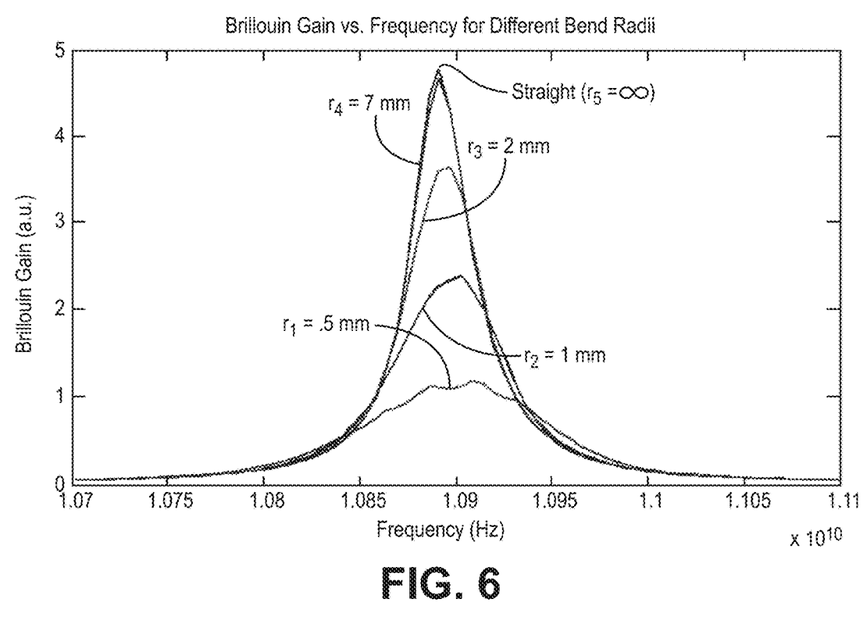
FIG. 6 is a plot of the normalized Brillouin gains versus frequency for the integrated optical waveguide of FIGS. 4-5 having a core with the respective specified values of bend radii, according to an embodiment.

FIG. 6 is a plot of the comparative Brillouin gains versus frequency, i.e., a plot of the comparative Brillouin gain profiles, of the integrated optical waveguide 26 of FIGS. 4-5 for respective approximate bend radii ($r_x$ of FIG. 3) $r_1$=0.5 millimeters (mm), $r_2$=1.0 mm, $r_3$=2.0 mm, $r_4$=7.0 mm, and $r_5$=∞ (i.e., the core has no bends and is thus straight), according to an embodiment in which the cladding layers 10 and 24 and the core 16 are formed from doped Sift. For each bend radii $r_x$, the Brillouin gain has a peak at the same frequency $1.09 \times 10^{10}$ Hz (wavelength $\lambda_{prop}$~27.5 mm) of the light wave propagating through the core 16. Furthermore, "au." stands for "arbitrary units," which renders the gain profiles comparative relative to one another.

It is evident that for approximate bend radii that are no more than about 25% of the wavelength $\lambda_{prop}$ of the propagating light wave, as the approximate bend radius $r_x$ becomes smaller, the Brillouin gain, and thus the magnitudes of the Stokes waves counter propagating through the core 16 of FIG. 3, also become smaller, particular at and around the peak of the Brillouin gain, according to an embodiment. It has been discovered that in general, for an optical waveguide formed from $SiO_2$, forming the core with at least one bend radius (or approximate bend radius) that is 0.5 mm or less decreases the peak Brillouin gain by approximately 80% as compared to a comparable optical waveguide having a straight core. This general rule is consistent with the plot of FIG. 6, according to which the Brillouin gain of the waveguide 26 (FIGS. 4-5) at an approximate bend radius $r_1$=0.5 mm (about 2% of $\lambda_{prop}$) is approximately unity, which is about ⅕ the Brillouin gain for the waveguide 26 having a straight core 16 (i.e., $r_5$=∞); that is, the Brillouin gain of the waveguide 26 at $r_1$=0.5 mm is reduced by approximately four arbitrary units, i.e., by about 80%, as compared to the waveguide 26 having a straight core 16.

Figure 7:
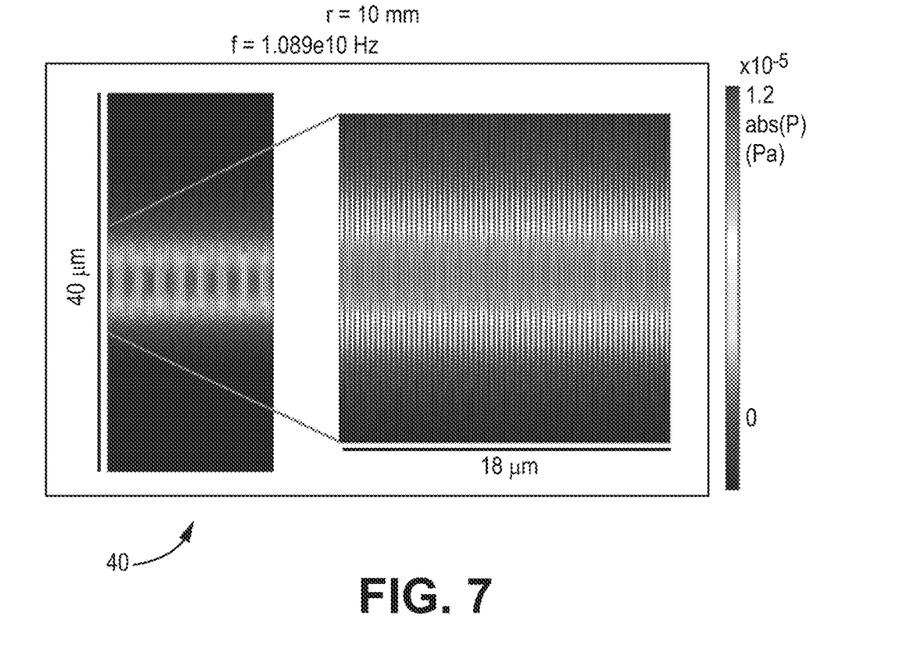
FIG. 7 is a two-dimensional plot of an acoustic pressure wave induced by a light wave propagating through the integrated optical waveguide of FIGS. 4-5 having a core with the specified value of bend radii, according to an embodiment.

FIG. 7 is a two-dimensional plot 40 of an acoustic pressure wave induced in a 40 μm×18 μm section of the core 16 of the integrated optical waveguide 26 of FIGS. 4-5 by a light wave propagating through the core, where the core has approximate bend radii of 10 mm, and where the light wave has the peak Brillouin gain frequency of $1.089 \times 10^{10}$ Hz, according to an embodiment.

Figure 8:
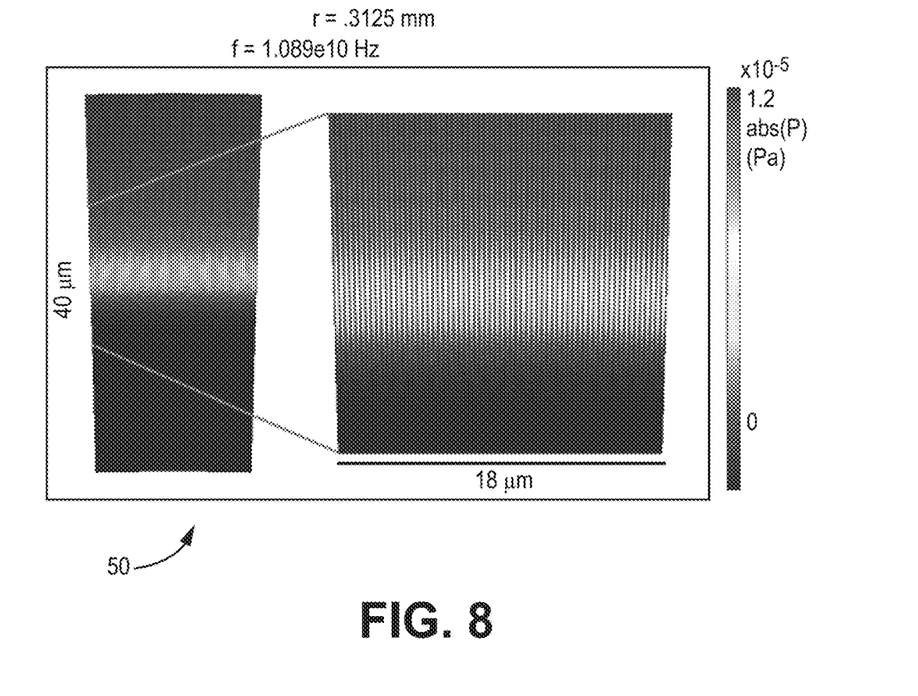
FIG. 8 is a two-dimensional plot of an acoustic pressure wave induced by a light wave propagating through the integrated optical waveguide of FIGS. 4-5 having a core with the specified value of bend radii, according to an embodiment in which the value of the bend radii corresponding to the plot of FIG. 8 is smaller than the value of the bend radii corresponding to the plot of FIG. 7.

FIG. 8 is a two-dimensional plot 50 of an acoustic pressure wave induced in a 40 μm×18 μm section of the core 16 of the integrated optical waveguide 26 of FIGS. 4-5 by a light wave propagating through the core, where the core has approximate bend radii of 0.3125 mm, and where the light wave has the peak Brillouin gain frequency of $1.089 \times 10^{10}$ Hz, according to an embodiment.

Referring to FIGS. 4-5 and 7-8, the pressure waves induced along the core 16 of the integrated optical waveguide 26 having the larger bend radii (FIG. 7) are significantly greater in magnitude than the pressure waves induced along the core having the smaller bend radii (FIG. 8). This result is consistent with the reduction in Brillouin gain with decreasing bend radii as described above in conjunction with FIG. 6.

Consequently, because the magnitudes of the peak Brillouin gain and the Stokes waves along the optical path defined by the core 16 (FIG. 3) are proportional to the pressure waves along the optical path, the plots 40 and 50 demonstrate that the Stokes waves induced along the optical path defined by the core having the smaller bend radii (FIG. 8) are significantly lower in magnitude than the Stokes waves induced along the optical path defined by the core having the larger bend radii (FIG. 7).

Referring to FIGS. 3-8, operation of the integrated optical waveguide 26 is described, according to an embodiment.

A light wave is pumped, or otherwise enters, into an input end (e.g., the left side in FIG. 3) of the integrated optical waveguide 26, propagates along an optical path defined by the waveguide core 16 as shown by the longer arrows within the core in FIG. 3, and exits an output end (e.g., the right side of FIG. 3) of the integrated optical waveguide.

The propagating light wave induces, within the core 16, Brillouin scattering, which generates counter-propagating Stokes waves in the core in the direction of the shorter arrows 30 in FIG. 3.

Because, as demonstrated by the orientation of the shorter arrows 30 relative to the longer arrows, the propagation direction of counter-propagating Stokes waves is fully aligned with the optical path defined by the core 16 only at the peaks and valleys of the bend regions 18, the energy of the Stokes waves that counter propagate in a reverse direction along the optical path is significantly less than the total energy of the induced Stokes waves.

Therefore, as stated above, the bend regions 18 of the core 16 reduce the Brillouin gain, and thus reduce the magnitude of the Stokes waves that counter propagate along the optical path defined by the core, as compared to an otherwise comparable waveguide having a straight core.

Such a reduction in the magnitude of the Stokes waves may render the integrated optical waveguide 24 more suitable for applications in which Stokes waves are undesired. Examples of such applications include optical sensors, optical modulators, optical switches, optical delay lines, optical frequency-comb generators, and optical interconnects.

Referring to FIGS. 1-8, alternate embodiments of the integrated optical waveguide 26 are contemplated. For example, the waveguide 26 can be modified for use with electromagnetic waves that are outside of the optical and visible portions of the electromagnetic spectrum. Furthermore, although shown as having a square cross section, the core 16 may have a cross section of another shape, such as rectangular, circular, or triangular.

Figure 9:
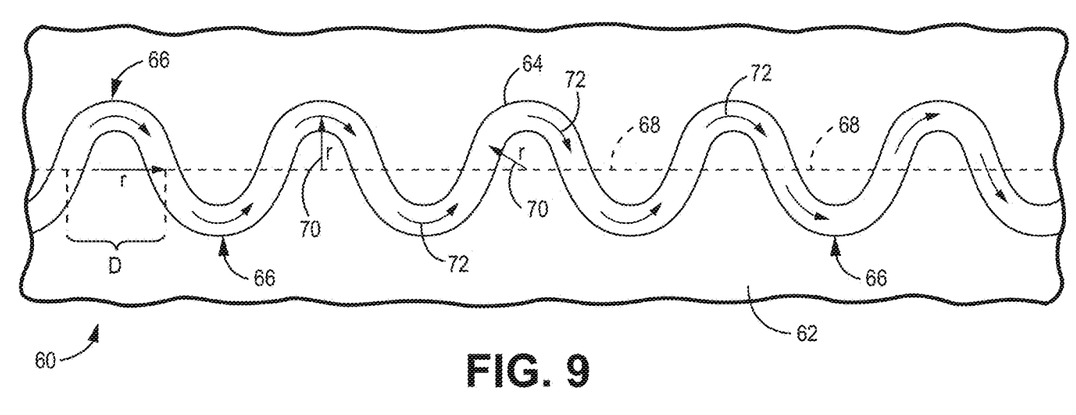
FIG. 9 is a plan view of the bottom cladding layer of FIGS. 1-2 and a core formed form the core layer of FIG. 2 during a process for forming an integrated optical waveguide having a reduced Brillouin gain, according to another embodiment.

FIG. 9 is a cutaway plan view of an integrated optical waveguide 60 having a reduced Brillouin gain, according to an embodiment. The waveguide 60 includes a bottom cladding layer 62 and a top cladding layer (not shown in FIG. 9), which can be similar to the bottom and top cladding layers 10 and 24 of the waveguide 26 of FIGS. 3-5. The waveguide 60 also includes a core 64, which, unlike the sinusoidal core 16 of the waveguide 26, is formed from alternating semicircular regions 66 each having approximately a same bend radius r. The respective diameter D of each semi-circular region 66 lies along an axis 68, and the respective radius r of each semi-circular region is measured from a respective center point 70 of the diameter D (r and D are measured to a longitudinal center of the core 64). In operation, as a light wave propagates through the core 64 in the direction indicated by arrows 72, the semi-circular regions 66 inhibit the generation of Stokes waves in a manner similar to the above-described manner in which the bend regions 18 of the waveguide 26 (FIGS. 3-5) inhibit the generation of Stokes waves; therefore, the Brillouin gain of the waveguide 60 is significantly less than the Brillouin gain of a comparable waveguide having a straight core. Furthermore, like the Brillouin gain of the waveguide 26, the Brillouin gain of the waveguide 60 decreases as the bend radii r of the regions 66 decrease.

Still referring to FIG. 9, alternate embodiments of the waveguide 60 are contemplated. For example, one or more of the semi-circular regions 66 may have a different bend radius r than one or more of the other semi-circular regions. Furthermore, the waveguide 60 can be modified for the propagation of electromagnetic waves outside of the optical and visible regions of the electromagnetic spectrum. Moreover, different sections of the core 64 can have different shapes; for example, one core section can be semi-circular per FIG. 9, and another core section can be sinusoidal per FIG. 3.

Figure 10:
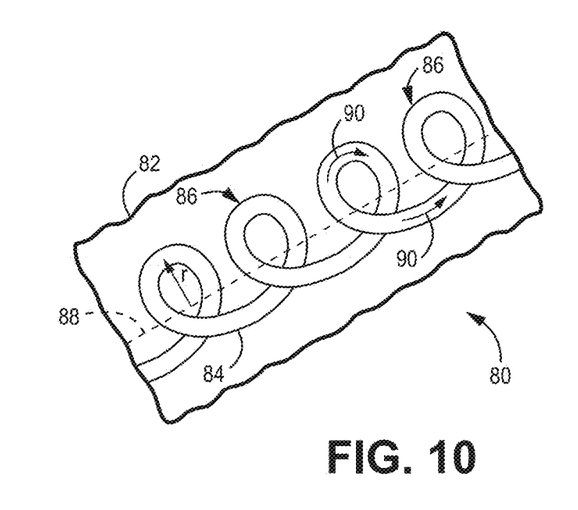
FIG. 10 is an isometric view of the bottom cladding layer of FIGS. 1-2 and a core formed form the core layer of FIG. 2 during a process for forming an integrated optical waveguide having a reduced Brillouin gain, according to yet another embodiment.

FIG. 10 is an isometric view with portions broken away of an integrated optical waveguide 80 having a reduced Brillouin gain, according to an embodiment. The waveguide 80 includes a bottom cladding layer 82 and a top cladding layer (not shown in FIG. 10), which can be similar to the bottom and top cladding layers 10 and 24 of the waveguide 26 of FIGS. 3-5. The waveguide 80 also includes a core 84, which, unlike the sinusoidal core 16 of the waveguide 26 and the alternating-semi-circular core 64 of the waveguide 60 of FIG. 9, is formed in a three-dimensional corkscrew shape with bend regions 86 each having approximately a same bend radius r measured from an axis 88 to a longitudinal center of the core. In operation, as a light wave propagates through the core 84 in the direction indicated by arrows 90, the bend regions 86 inhibit the generation of Stokes waves in a manner similar to the above-described manner in which the bend regions 18 of the waveguide 26 (FIGS. 3-5) inhibit the generation of Stokes waves; therefore, the Brillouin gain of the waveguide 80 is significantly less than the Brillouin gain of a comparable waveguide having a straight core. Furthermore, like the Brillouin gains of the waveguides 26 and 60, the Brillouin gain of the waveguide 80 decreases as the bend radii r of the regions 86 decrease.

Still referring to FIG. 10, alternate embodiments of the waveguide 80 are contemplated. For example, one or more of the bend regions 86 may have a different bend radius r than one or more of the other bend regions. Furthermore, the waveguide 80 can be modified for the propagation of electromagnetic waves outside of the optical and visible regions of the electromagnetic spectrum. Moreover, different sections of the core 64 can have different shapes.

Figure 11:
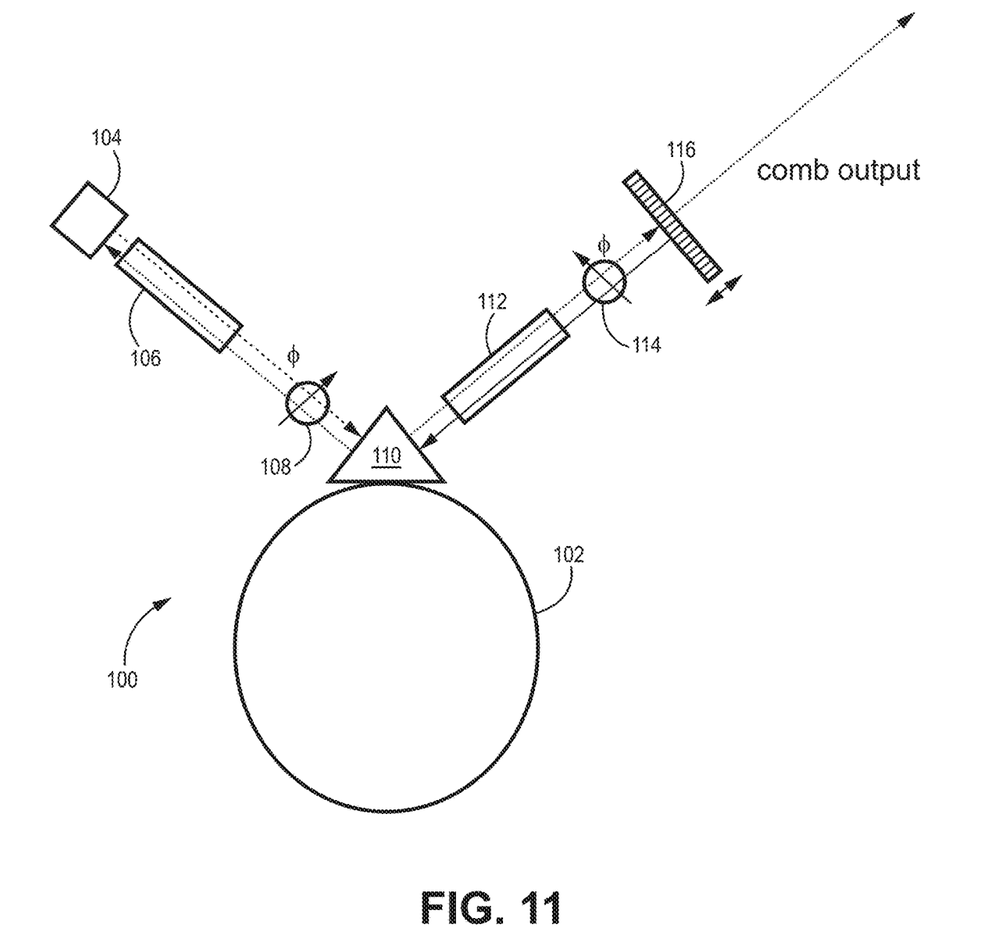
FIG. 11 is a diagram of a frequency-comb generator that includes a ring resonator with reduced Brillouin gain, according to an embodiment.

FIG. 11 is a diagram of a frequency-comb generator 100, which includes a ring resonator 102 with reduced Brillouin gain, according to an embodiment.

In addition to the ring resonator 102, the frequency-comb generator 100 includes a laser 104, an input collimator 106, an input phase rotator 108, a coupling prism 110, an output collimator 112, an output phase rotator 114, and a movable, partially transmissive mirror 116 from which light waves at multiple frequencies are output, these output light waves forming a frequency comb.

All of the components of the frequency-comb generator 100, except for the ring resonator 102, can be conventional.

The ring resonator 102 is a ring having the Stokes-wave-inhibiting configuration of one of the waveguides 26, 60, and 80, or of any other waveguide with a core having at least one bend radius, or approximate bend radius, as described above in conjunction with FIGS. 3 and 9-10; therefore, the ring resonator 102 has a Brillouin gain that is less than the Brillouin gain of a comparable ring resonator with a core having no bend radii or approximate bend radii. That is, the ring resonator includes at least one cladding layer having a first index of refraction $n_1$ and a core disposed within the cladding layer, having a second index of refraction $n_2 > n_1$, and having a least one bend radius.

By inhibiting generation of Stokes waves, the ring resonator 102 reduces distortion in the frequency-comb output from the mirror 116. That is, by inhibiting generation of Stokes waves, the ring resonator 102 effectively filters unwanted frequencies and other distortion from the output frequency comb.

Operation of the frequency-comb generator 100 is described, according to an embodiment.

The laser 104 generates coherent light waves of multiple frequencies.

The collimator 106 and phase rotator 108 collimate and rotate the phases of these light waves, and the prism 110 separates the light waves.

The ring resonator 102 is sized such that only light waves having wavelengths that are integer fractions of the circumference of the ring resonator are amplified.

The amplified light waves exit the ring resonator 102, propagate through the prism 110, collimator 112, phase rotator 114, and mirror 116 to form a comb of light waves of different frequencies.

Still referring to FIG. 11, alternate embodiments are contemplated. For example, devices with reduced Brillouin gains other than the ring resonator 102 can be constructed according to the principles described above in conjunction with FIGS. 1-10.

Figure 12:
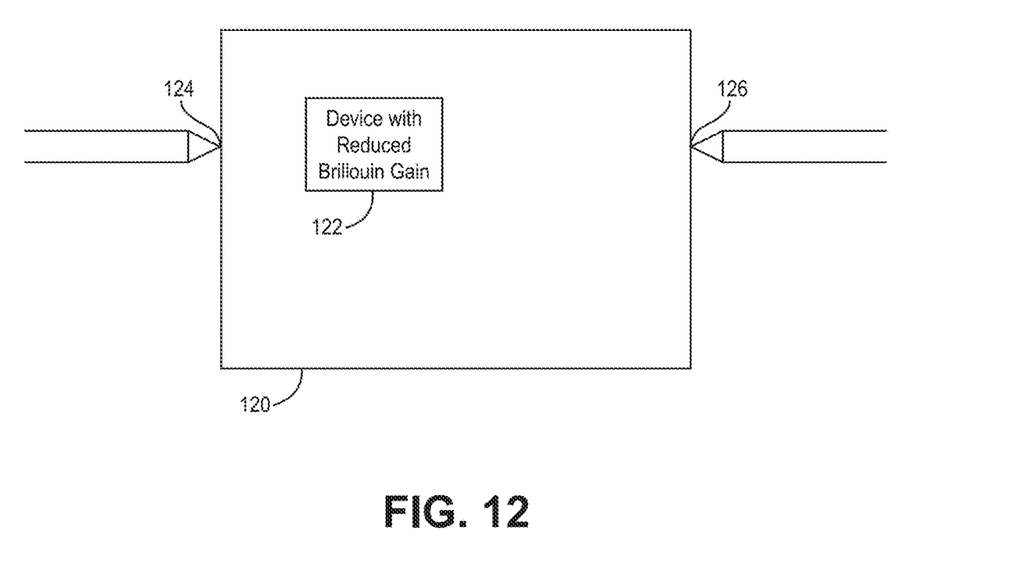
FIG. 12 is a diagram of an integrated photonics circuit that incorporates at least one device, such as a waveguide formed according to FIGS. 1-5, FIG. 9, or FIG. 10, or such as the frequency-comb generator of FIG. 11, according to an embodiment.

FIG. 12 is a diagram of an integrated photonics circuit 120 that incorporates at least one device 122 with reduced Brillouin gain, such as the waveguides 26, 60, and 80 of FIGS. 4-5, 9, and 10, or such as the frequency-comb generator 100 of FIG. 11, according to an embodiment.

In addition to the device 122, the integrated photonics circuit 120 includes an optical input port 124 and an optical output port 126.

In operation, a light wave propagates into the port 124, to and through the device 122, and out from the port 126.

If the device 122 is a frequency-comb generator such as the frequency-comb generator 100 of FIG. 11, then the input port 124 can be omitted if a source laser for the frequency-comb generator is disposed on the integrated photonics circuit 120.

Furthermore, the integrated photonics circuit 120 can be part of a larger system, such as a computer system, a navigation system, or a smart phone, and can include electronic circuitry. For example, the system can include processing circuitry, such as a microprocessor or microcontroller, coupled to the integrated photonics circuit 120, and the processing circuit and integrated photonics circuit can be disposed on the same integrated-circuit (IC) die or other die, or on different IC dies or other dies.

Still referring to FIG. 12, alternate embodiments of the integrated photonics circuit 120 are contemplated. For example, although described as including only one device 122 with reduced Brillouin gain, the circuit 120 can include multiple devices with reduced Brillouin gain, and multiple input ports and output ports. Furthermore, the device 122 can be configured to operate with electromagnetic signals that are outside of the optical or visible frequency spectrum.

EXAMPLE EMBODIMENTS

Example 1 includes an integrated waveguide, comprising: a Brillouin gain; a cladding having a first index of refraction; and a core disposed within the cladding, having a second index of refraction that is greater than the first index of refraction, and having a shape that is configured to cause the Brillouin gain to be less than the Brillouin gain would be if the core were straight.

Example 2 includes the integrated waveguide of Example 1 wherein the core includes at least one bend.

Example 3 includes the integrated waveguide of any of Examples 1-2 wherein the core includes multiple bends have approximately equal radii or approximate radii.

Example 4 includes the integrated waveguide of any of Examples 1-3 wherein the core includes multiple bends each having a respective radius or approximate radius, the radius or approximate radius of one of the bends being different than the radius or approximate radius of another of the bends.

Example 5 includes the integrated waveguide of any of Examples 1-4 wherein the core includes at least one bend having a radius or approximate radius that is no more than approximately twenty-five percent of a wavelength of an electromagnetic wave that the core is configured to carry.

Example 6 includes the integrated waveguide of any of Examples 1-5 wherein the core includes at least one bend having a radius or approximate radius that is no more than approximately two percent of a wavelength of an electromagnetic wave that the core is configured to carry.

Example 7 includes the integrated waveguide of any of Examples 1-6 wherein the core has an approximately sinusoidal shape in at least one dimension.

Example 8 includes the integrated waveguide of any of Examples 1-7 wherein the core includes sections each being approximately semicircular in at least one dimension.

Example 9 includes a method, comprising: driving an integrated waveguide with an electromagnetic wave; and causing the electromagnetic wave to traverse a curved path through the integrated waveguide to reduce a magnitude of a Stoke wave induced in the integrated waveguide by the electromagnetic wave as compared to a magnitude that the Stoke wave would have if the curved path were straight.

Example 10 includes the method of Example 9 wherein: driving the integrated waveguide includes driving the integrated waveguide with an optical wave; and causing the electromagnetic wave to traverse a curved path includes causing the optical wave to traverse a curved optical path.

Example 11 includes the method of Example 10 wherein causing the optical wave to traverse a curved optical path includes causing the wave to traverse at least one bend in the path.

Example 12 includes the method of any of Examples 10-11 wherein causing the optical wave to traverse a curved optical path includes causing the wave to traverse the curved optical path to reduce a magnitude of a Stoke wave induced along the curved path as compared to a magnitude that the Stoke wave would have if the path were straight.

Example 13 includes a method, comprising: forming a first optical cladding layer having a first index of refraction and a surface; forming, over the surface of the first optical cladding layer, a core layer having a second index of refraction; forming, from the core layer, a core having at least one bend; and forming, over the core and the first optical cladding layer, a second optical cladding layer having approximately the first index of refraction.

Example 14 includes the method of Example 13 wherein forming the core includes forming the least one bend with a radius or approximate radius that is small enough to reduce a Brillouin gain of a waveguide formed by the core and the first and second optical cladding layers as compared to a Brillouin gain of the waveguide if the core did not include at least one bend.

Example 15 includes the method of any of Examples 13-14 wherein forming the core includes forming the least one bend with a radius or approximate radius that is small enough to reduce an energy of a Stokes wave induced in the core by an optical wave propagating through the core as compared to an energy of a Stokes wave that would be induced in the core by the optical wave if the core did not include at least one bend.

Example 16 includes the method of any of Examples 13-15 wherein: forming the first cladding layer includes forming the first cladding layer from a first material; forming the core layer includes forming the core layer from a second material that is different from the first material; and forming the second cladding layer includes forming the second cladding layer from the first material.

Example 17 includes the method of any of Examples 13-16 wherein forming the core includes forming the at least one bend approximately in a plane that is approximately parallel to the surface of the first cladding layer.

Example 18 includes the method of any of Examples 13-17 wherein forming the core includes forming the at least one bend approximately in a plane that is not parallel to the surface of the first cladding layer.

Example 19 includes the method of any of Examples 13-18 wherein forming the core includes forming the at least one bend to be substantially nonplanar.

Example 20 includes an integrated photonics structure, comprising: an optical device having a portion that includes, a Brillouin gain, a cladding having a first index of refraction, and a core having a second index of refraction that is greater than the first index of refraction, disposed within the cladding, and having a shape that is configured to cause the Brillouin gain to be less than the Brillouin gain would be if the core were straight.

Example 21 includes the integrated photonics structure of Example 20 wherein the optical device includes a frequency-comb generator.

Example 22 includes a system, comprising: an integrated photonics structure, including an optical device having a portion that includes, a Brillouin gain, a cladding having a first index of refraction, and a core having a second index of refraction that is greater than the first index of refraction, disposed within the cladding, and having a shape that is configured to cause the Brillouin gain to be less than the Brillouin gain would be if the core were straight; and a processing circuit coupled to the integrated photonics structure.

Example 23 includes the system of Example 22 wherein the integrated photonics structure and the processing circuit are disposed on a same integrated-circuit die.

Example 24 includes the system of any of Examples 22-23 wherein the integrated photonics structure and the processing circuit are disposed on a same integrated circuit.

Example 25 includes the system of any of Examples 22-24 wherein the integrated photonics structure and the processing circuit are disposed on different integrated-circuit dies.

Example 26 includes the system of any of Examples 22-25 wherein the integrated photonics structure and the processing circuit are disposed on different integrated circuits.

Example 27 includes the system of any of Examples 22-26 wherein the processing circuit includes a microprocessor or a microcontroller.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple integrated-circuit (IC) or integrated-photonic (IP) dies to form one or more ICs/IPs, these one or more ICs/IPS may be coupled to one or more other ICs/IPs. Furthermore, one or more components of a described apparatus or system may have been omitted from the description for clarity or another reason. Moreover, one or more components of a described apparatus or system that have been included in the description may be omitted from the apparatus or system.

What is claimed is:

1. An integrated waveguide, comprising:
a cladding having a first index of refraction; and
a core disposed within the cladding, having an approximate uniform second index of refraction that is greater than the first index of refraction, having an approximately uniform cross-section area, and having a shape that is configured to cause a Brillouin gain associated the core to be less than the Brillouin gain would be if the core were straight.

2. The integrated waveguide of claim 1 wherein the core includes at least one bend.

3. The integrated waveguide of claim 1 wherein the core includes multiple bends have approximately equal radii or approximate radii.

4. The integrated waveguide of claim 1 wherein the core includes multiple bends each having a respective radius or approximate radius, the radius or approximate radius of one of the bends being different than the radius or approximate radius of another of the bends.

5. The integrated waveguide of claim 1 wherein the core includes at least one bend having a radius or approximate radius that is no more than approximately twenty-five percent of a wavelength of an electromagnetic wave that the core is configured to carry.

6. The integrated waveguide of claim 1 wherein the core includes at least one bend having a radius or approximate radius that is no more than approximately two percent of a wavelength of an electromagnetic wave that the core is configured to carry.

7. The integrated waveguide of claim 1 wherein the core has an approximately sinusoidal shape in at least two dimensions.

8. The integrated waveguide of claim 1 wherein the core includes sections each being approximately semicircular in at least two dimensions.

9. A method, comprising:
driving an integrated waveguide with an electromagnetic wave; and
causing the electromagnetic wave to traverse a curved path through the integrated waveguide to reduce a magnitude of a Stokes wave induced in a core of the integrated waveguide by the electromagnetic wave as compared to a magnitude that the Stokes wave would have if the curved path were straight, the core having a substantially uniform product of relative permittivity and relative permeability and having substantially uniform cross-section dimensions.

10. The method of claim 9 wherein:
driving the integrated waveguide includes driving the integrated waveguide with an optical wave; and
causing the electromagnetic wave to traverse a curved path includes causing the optical wave to traverse a curved optical path.

11. The method of claim 10 wherein causing the optical wave to traverse a curved optical path includes causing the wave to traverse at least one bend in the path.

12. The method of claim 10 wherein causing the optical wave to traverse a curved optical path includes causing the wave to traverse the curved optical path to reduce a magnitude of a Stokes wave induced along the curved path as compared to a magnitude that the Stokes wave would have if the path were straight.

13. A method, comprising:
forming a first optical cladding layer having a first index of refraction and a surface;
forming, over the surface of the first optical cladding layer, a core layer having an approximately uniform second index of refraction;
forming, from the core layer, a core having at least one bend and having an approximately uniform cross-section area; and
forming, over the core and the first optical cladding layer, a second optical cladding layer having approximately the first index of refraction.

14. The method of claim 13 wherein forming the core includes forming the least one bend with a radius or approximate radius that is small enough to reduce a Brillouin gain of a waveguide formed by the core and the first and second optical cladding layers as compared to a Brillouin gain of the waveguide if the core did not include at least one bend.

15. The method of claim 13 wherein forming the core includes forming the least one bend with a radius or approximate radius that is small enough to reduce an energy of a Stokes wave induced in the core by an optical wave propagating through the core as compared to an energy of a Stokes wave that would be induced in the core by the optical wave if the core did not include at least one bend.

16. The method of claim 13 wherein:
forming the first cladding layer includes forming the first cladding layer from a first material;
forming the core layer includes forming the core layer from a second material that is different from the first material; and
forming the second cladding layer includes forming the second cladding layer from the first material.

17. The method of claim 13 wherein forming the core includes forming the at least one bend approximately in a plane that is approximately parallel to the surface of the first cladding layer.

18. A method, comprising:
forming a first optical cladding layer having a first index of refraction and a surface;
forming, over the surface of the first optical cladding layer, a core layer having a second index of refraction;
forming, from the core layer, a core having at least one bend approximately in a plane that is not parallel to the surface of the first cladding layer; and
forming, over the core and the first optical cladding layer, a second optical cladding layer having approximately the first index of refraction.

19. A method, comprising:
forming a first optical cladding layer having a first index of refraction and a surface;
forming, over the surface of the first optical cladding layer, a core layer having a second index of refraction;
forming, from the core layer, a core having at least one bend that is substantially nonplanar; and
forming, over the core and the first optical cladding layer, a second optical cladding layer having approximately the first index of refraction.

20. An integrated photonics structure, comprising:
an optical device having a portion that includes,
a cladding having a first index of refraction, and
a core disposed within the cladding, having an approximately uniform second index of refraction that is greater than the first index of refraction, having an approximately uniform cross-section area, and having a shape that is configured to cause a Brillouin gain associated with the core to be less than the Brillouin gain would be if the core were straight.

21. The integrated photonics structure of claim 20 wherein the optical device includes a frequency-comb generator.

22. A system, comprising:
an integrated photonics structure, including
an optical device having a portion that includes,
a cladding having a first index of refraction, and
a core disposed within the cladding, having an approximately uniform second index of refraction that is greater than the first index of refraction, having an approximately uniform cross-section area, and having a shape that is configured to cause a Brillouin gain associated with the core to be less than the Brillouin gain would be if the core were straight; and
a processing circuit coupled to the integrated photonics structure.

23. The system of claim 22 wherein the integrated photonics structure and the processing circuit are disposed on a same integrated-circuit die.

24. The system of claim 22 wherein the integrated photonics structure and the processing circuit are disposed on a same integrated circuit.

25. The system of claim 22 wherein the integrated photonics structure and the processing circuit are disposed on different integrated-circuit dies.

26. The system of claim 22 wherein the integrated photonics structure and the processing circuit are disposed on different integrated circuits.

27. The system of claim 22 wherein the processing circuit includes a microprocessor or a microcontroller.

* * * * *